May 28, 1946.    O. A. DISHMAKER    2,400,980
KICKING ANIMAL TOY
Filed Feb. 22, 1945
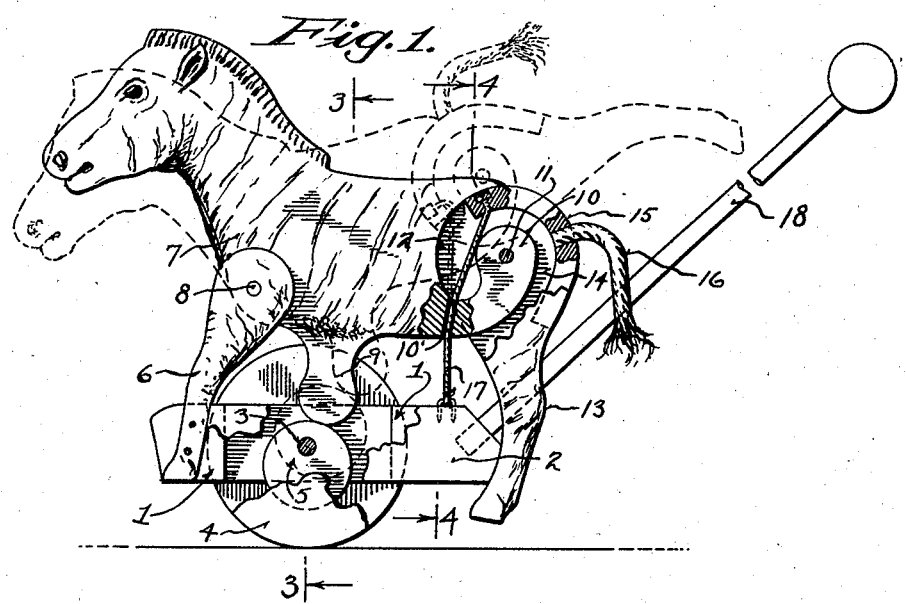
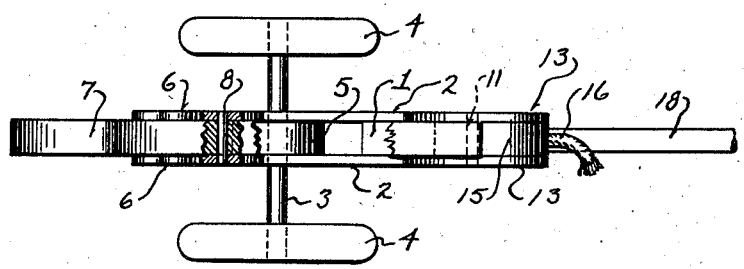
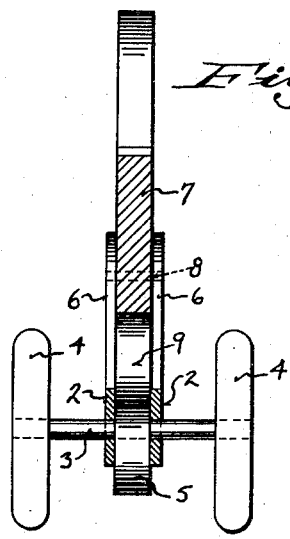
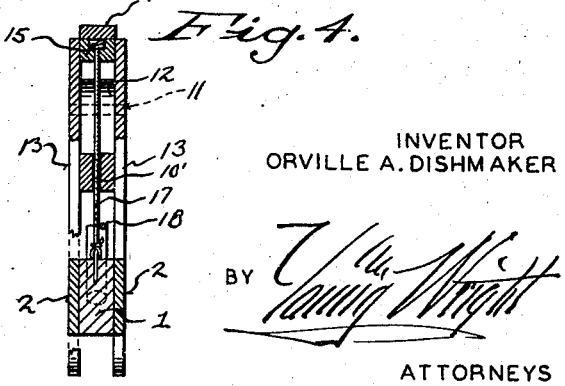
INVENTOR
ORVILLE A. DISHMAKER
BY
ATTORNEYS Patented May 28, 1946

2,400,980

UNITED STATES PATENT OFFICE 2,400,980

KICKING ANIMAL TOY

Orville A. Dishmaker, Oshkosh, Wis., assignor of one-half to Leonard J. Kaufman, Manitowoc, Wis.

Application February 22, 1945, Serial No. 579,190

1 Claim. (Cl. 46—107)

My invention refers to travelling toys, and it has for its primary object to provide a galloping animal toy under control of a wheeled carriage.

Another object of my invention is to provide a wheeled carriage associated with a cam, the carriage having the legs of an animal extending from its front end, with the body of the animal pivotly mounted thereon, engaging the cam, whereby the animal will rise and fall incidental to travel of the carriage.

Another object of my invention is to provide a wheeled carriage associated with a cam, the carriage having the legs of an animal extending from its front end, with the body of the animal pivotly mounted thereon, engaging the cam, whereby the animal will rise and fall incidental to travel of the carriage, the mechanism being so arranged that a runner connnection between the carriage and pivoted hind legs will cause the same to kick backward, simulating a galloping motion.

It should be further understood that any four-legged animal may be featured upon the carriage.

With the above and other minor objects in view, the invention consists in certain peculiarities of construction and combination of parts as will be hereinafter fully set forth with reference to the drawing, and subsequently claimed.

In the drawing:

Figure 1 represents a side elevation of a galloping toy, embodying the features of my invention, with parts broken away and in section to more clearly illustrate structural features.

Figure 2, a top plan view of the same, with parts broken away and in section, to more clearly illustrate details of construction.

Figure 3, an end sectional view of the animal, the section being indicated by line 3—3 of Figure 1, and Figure 4, another sectional end view through the toy, the section being indicated by line 4—4 of Figure 1.

Referring by characters to the drawing, front and rear spaced blocks 1—1 are connected by panels 2—2, forming a carriage.

The panels have extending therethrough, an axle 3, which carries traction wheels 4—4, and said axle has also secured thereto an eccentric 5, which is mounted in the cavity of the carriage, formed by the panels 2.

Secured to the front block 1 and extending upwardly therefrom, are a pair of members or animal legs 6, and their upper ends engage an animal body 7, which is connected to the legs by a pivot 8.

The belly of the animal has depending therefrom a projection 9, with a curved surface, engaging the eccentric 5.

The rump of the animal terminates with an upwardly curved neck, 10, which neck carries a pivot pin 11. The rump is further cut away, in the segment of a circle 12, which is described about the pivot pin 11.

A pair of members or hind legs 13 of an animal, and their circular hip ends 14, are mounted upon the pivot pin 11, and it will be noted that the hip ends of legs are formed in a circle described from the pivot pin and corresponding to the circular cutaway portion 12 of the animal's hind quarters.

The circular portions of the legs 13, encase the neck 10, and said circular portions are also connected by a circular shell 15, which closes the gap between the rump portions of the legs, and said shell has extending therefrom a flexible tail 16.

The neck 10, at its throat portion, is provided with an aperture 10', through which a runner 17 is trained, its upper end being connected to the shell 15 and its lower end is secured to the rear block 1 of the carriage.

The carriage has connected thereto, a draft-rod 18, which is attached to move the toy back and forth.

From the foregoing description, it will be noted that when the animal is at rest, the projection 9 engages, through gravity, the eccentric 5, and the hind legs, through gravity control, rest in their normal standing position, straddling the carriage.

It is apparent that when the carriage is moved, the eccentric will lift the animal's body about the pivot 8, at the front legs, and as said body is lifted, the runner will hold the shell portion of the hind legs, at the point of the runner connection thereto, whereby the hind legs will rock upon the pivot pin 11 to simulate a kick or galloping motion of the animal.

It is apparent, due to the circular shell hip portion and connected legs being rotated upon a pivot carried by the neck, that the animal's rear portion presents, in appearance, a solid rump, which rotates back and forth in the circular curve segment. Thus said animal has a somewhat lifelike appearance when these parts are moved back and forth, simulating a kick.

While I have particularly described this toy associated with animals, it is manifest that other forms may be substituted for those of animal creatures, without departing from the spirit of my invention, as, for examples, the figure may be that of an acrobat, or the like.

I claim:

An animal toy comprising a carriage, having a central opening therein, front legs extending upwardly from the carriage, an axle extending through the carriage opening, tractor wheels secured thereto, an eccentric carried by the axle within the carriage opening, an animal body pivotally connected to the front legs, a projection extending from the body rearwardly of the front legs engaging the eccentric, a curved neck extending from the rump end of the body, a pivot pin mounted therein, said rump end being curved in a segment of a circle from the neck pin, a pair of hind legs, a circular shell connecting the legs nested and rotated in the circular segment of the rump to simulate an unbroken contour of the rear portion of said animal, the said legs and shell being rotative upon the pivot pin, and a runner connecting the end of the circular shell extending through an aperture of the curved neck and secured to the carriage.

ORVILLE A. DISHMAKER.